Dec. 15, 1970   J. J. TAYLOR ET AL   3,547,602
METHOD OF MAKING MOLD ASSEMBLIES
Filed April 30, 1968   3 Sheets-Sheet 1

Inventors
John J. Taylor
Edward H. Wale
By their Attorney

Dec. 15, 1970   J. J. TAYLOR ET AL   3,547,602
METHOD OF MAKING MOLD ASSEMBLIES
Filed April 30, 1968   3 Sheets-Sheet 2

Dec. 15, 1970     J. J. TAYLOR ET AL     3,547,602
METHOD OF MAKING MOLD ASSEMBLIES
Filed April 30, 1968     3 Sheets-Sheet 3
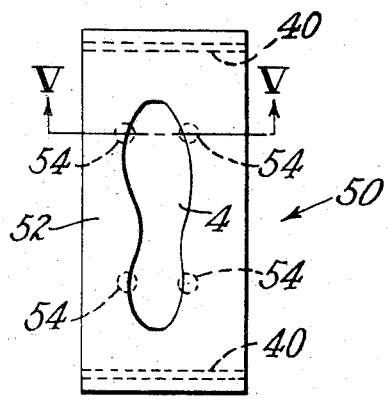
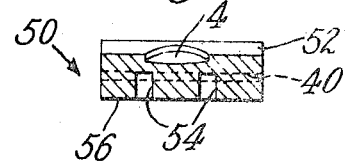
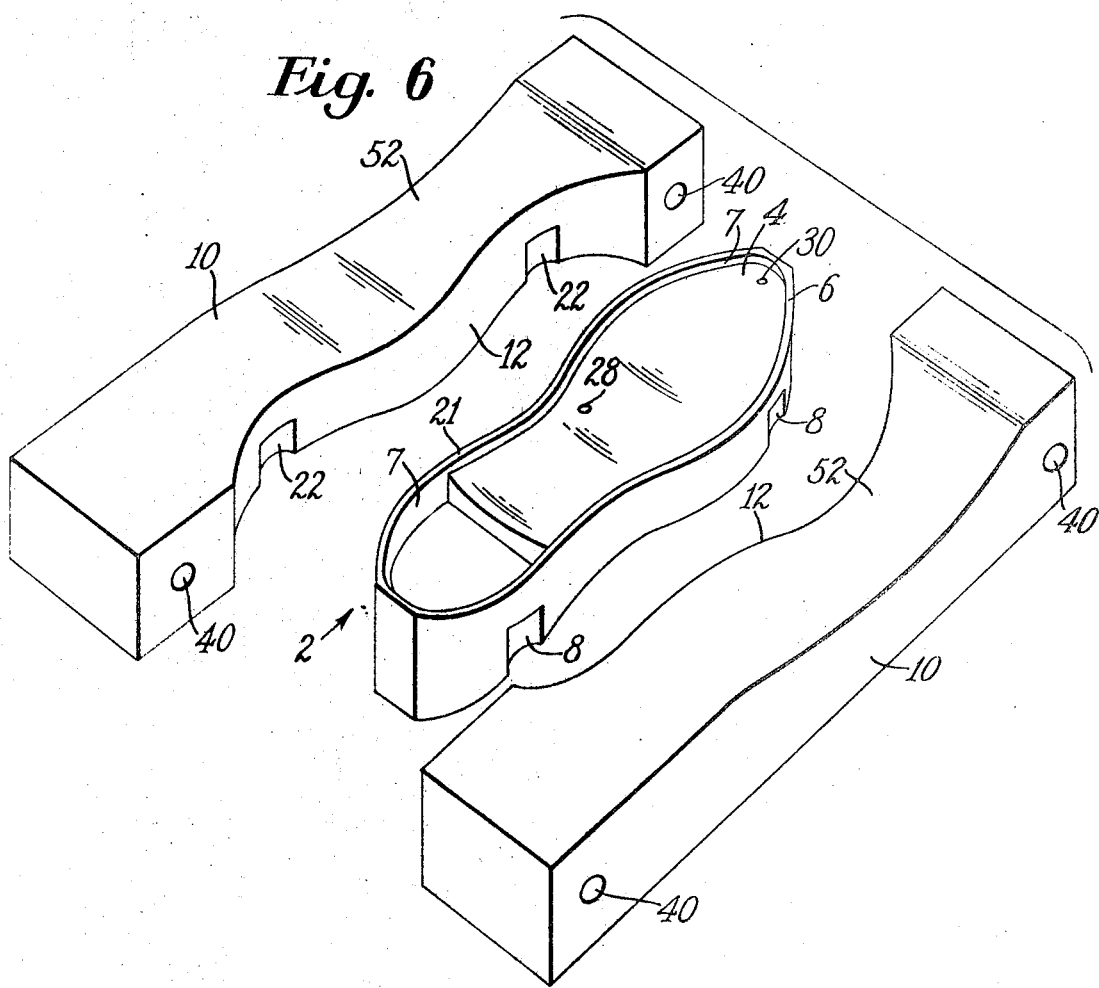

United States Patent Office 3,547,602
Patented Dec. 15, 1970

3,547,602
METHOD OF MAKING MOLD ASSEMBLIES
John J. Taylor and Edward H. Wale, Leicester, England, assignors to USM Corporation, Flemington, N.J., a corporation of New Jersey
Continuation-in-part of abandoned application Ser. No. 575,896, Aug. 29, 1966. This application Apr. 30, 1968, Ser. No. 725,472
Int. Cl. B23p *17/00, 13/04;* B21d *39/02*
U.S. Cl. 29—416                     1 Claim

ABSTRACT OF THE DISCLOSURE

A method of making a mold assembly for the molding of soles onto shoe uppers comprising casting a unitary block, providing the upper surface of the block with a recess for the molding of a sole, boring holes in the under surface of the block to a point short of the upper surface of the block, cutting a central portion from the block and around the recess, the cut extending through the holes, separating the outer portion of the block into two side portions, and attaching cylindrical members in recesses formed by the holes to facilitate subsequent realignment of the central portion and the side portions of the mold assembly.

CROSS REFERENCE TO RELATED APPLICATION

This is a continuation-in-part of application Ser. No. 575,896, filed Aug. 29, 1966, in the names of John J. Taylor and Edward H. Wale, now abandoned.

BACKGROUND OF THE INVENTION

Field of the invention

This invention relates to mold assemblies and is directed more particularly to a method of making an injection molding assembly for use in molding shoe bottom units onto the bottoms of lasted uppers.

Description of the prior art

In the manufacture of shoes, it is now common practice to injection mold a sole or a sole and heel unit directly onto a lasted upper. The mold assemblies used in the molding of soles to uppers generally comprise a bottom mold member, and two side mold members which cooperate with a lasted upper to define a mold cavity. A molten elastometric material is injected into the mold cavity until the cavity is filled. After sufficient cooling time has elapsed, the mold members are separated, exposing a newly molded sole attached to the bottom of the lasted upper.

The individual components of a mold assembly as above described are generally made independently of each other from machined metal. The components are then assembled to determine the extent of further machining necessary to assure alignment of the various components with one another.

While such mold assemblies have proved generally satisfactory in most respects, the present method of manufacturing such mold assemblies, i.e., by machining, has proved to be extremely expensive, causing mold assembly prices to remain at undesirably high levels. The high cost of mold manufacture is further aggravated by the necessity of subsequently aligning the mold assembly pieces with one another and further machining to insure a proper fit.

SUMMARY OF THE INVENTION

It is an object of the present invention to provide a method of making the mold assembly which is less expensive than methods currently in use.

A still further object of the invention is to provide a method of making the mold assembly so that the mold assembly components may be readily aligned with each other without their having been machined to close tolerances.

With the above and other objects in view, as will hereinafter appear, the present invention in one aspect contemplates a method of making a mold assembly in which the bottom mold member and welt defining means are cut from a single block whereby to reduce the costs of manufacture and facilitate alignment of the mold members.

In accordance with a still further feature of the invention, the welt defining means are provided with aligning members which are engageable with complementarily shaped openings in the sides of the bottom mold member to accurately align the welt defining means with the bottom mold member during the mold closing operation.

The above and other features of the invention, including various novel details of construction and combinations of parts, will now be more particularly described with reference to the accompanying drawings and pointed out in the claim. It will be understood that the particular method embodying the invention is described and shown by way of illustration only and not as a limitation of the invention. The principles and features of this invention may be employed in various and numerous embodiments without departing from the scope of the invention.

BRIEF DESCRIPTION OF THE DRAWINGS

Reference is now made to the accompanying drawings in which there is shown an illustrative embodiment of the invention from which its novel features and advantages will be apparent.

FIG. 4 is a plan view illustrating a cast block from which a mold assembly is being made;

FIG. 5 is a sectional view taken along line V—V of FIG. 4; and

FIG. 6 is a perspective view showing the cast block of FIG. 4 after it has been cut and separated in accordance with the invention.

DESCRIPTION OF THE PREFERRED EMBODIMENTS

Figure 1:
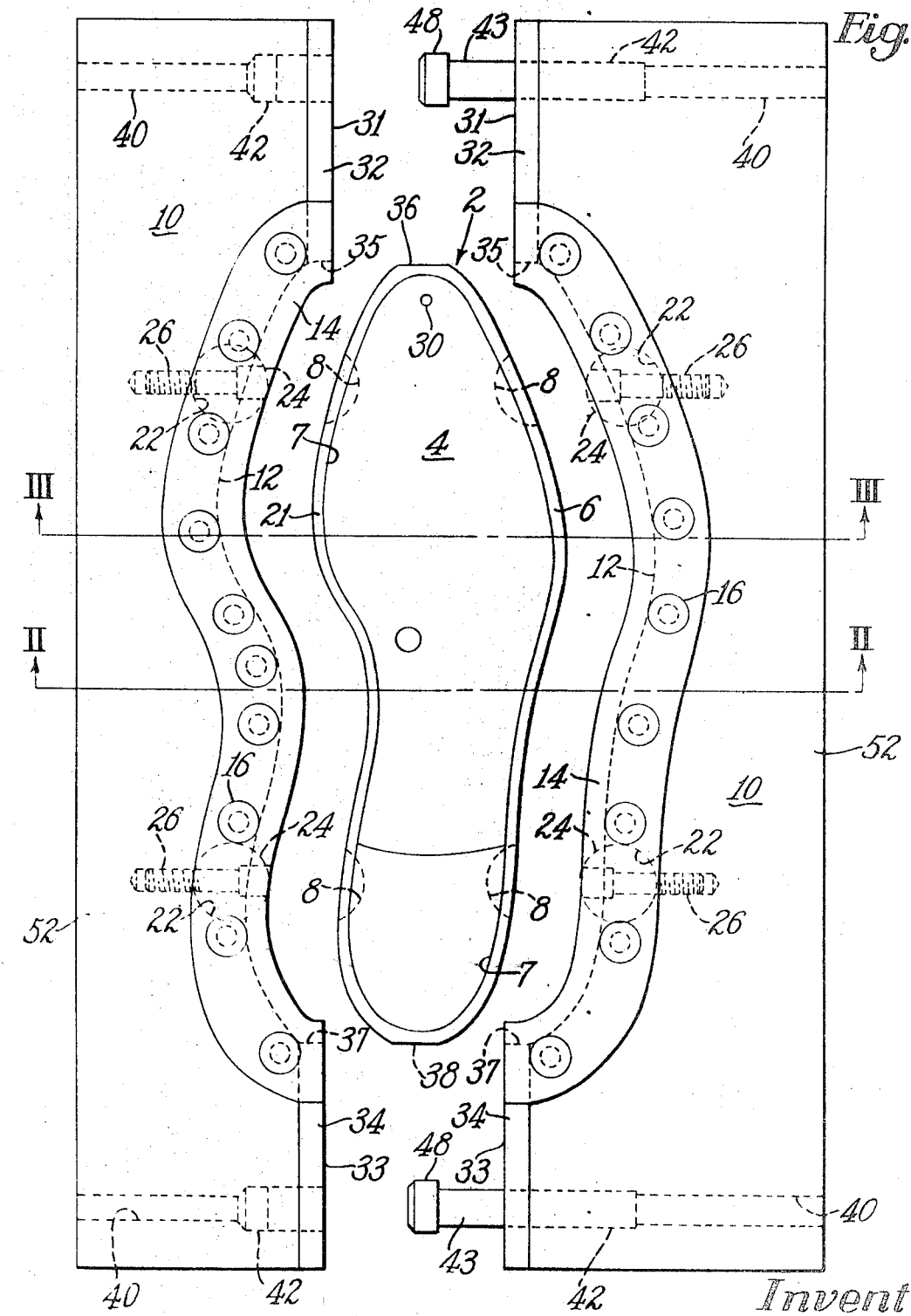
FIG. 1 is a plan view of one form of mold assembly embodying the invention.

Referring to the drawings, it will be seen that the illustrative mold assembly includes a bottom mold member 2 having a recess 4 in its upper surface. The recess 4 forms a cavity of the size and shape desired of the sole unit to be molded. The recess 4 is joined by a wall 6 which affords a continuous surface 7 for the molding of the edge surface of a sole and heel unit thereby eliminating the possibility of a flash line being formed on the edge of the sole. The bottom mold member 2 is provided with openings 8 which receive alignment means associated with a pair of side members 10, to insure proper alignment of the side members with the bottom mold member, as will be described below.

Figure 2:
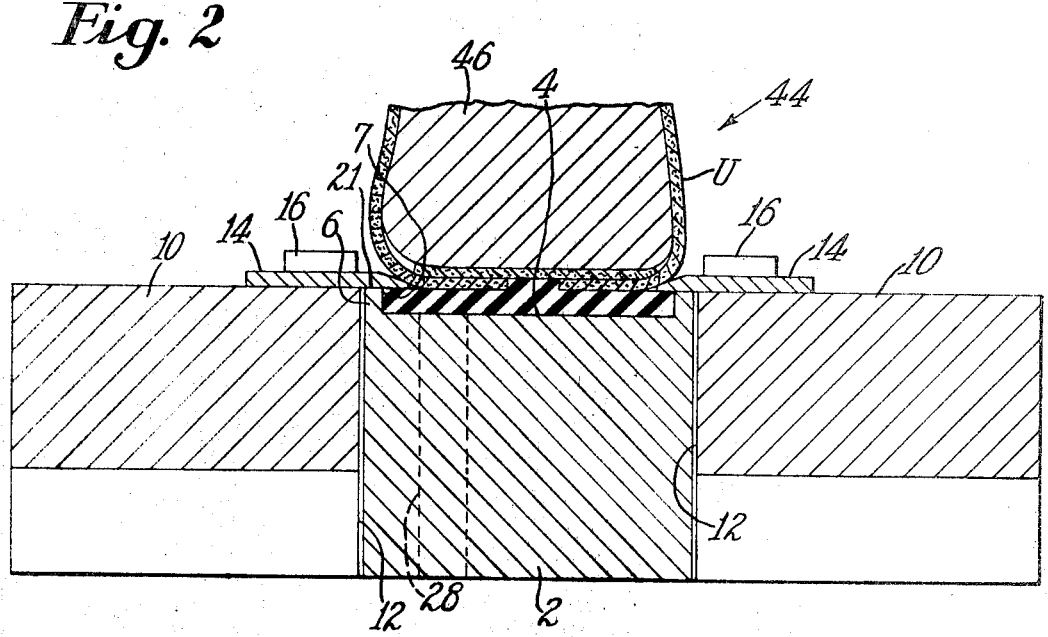
FIG. 2 is a sectional view along line II—II of FIG. 1, however, the welt defining means are shown in the closed position.
Figure 3:
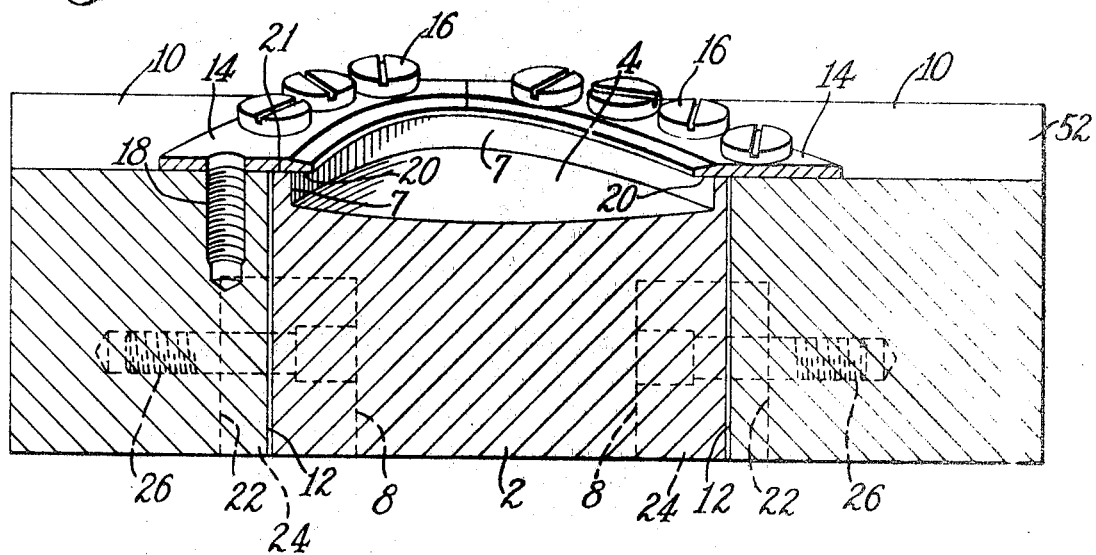
FIG. 3 is a sectional view taken along line III—III of FIG. 1, again with the welt defining means in the closed position.

The side members 10 comprise welt defining means which may be integral or may be welt plate carriers having welt plates attached thereto, the latter being preferable. In which case, each welt plate carrier 10 has attached thereto a welt plate 14, which may be secured to the welt plate carriers by screws 16 received in threaded bores 18 (FIG. 3). The welt plate carriers 10 have inner surfaces 12 which are complementarily engageable with the bottom mold member 2. The lower surface 20 of the welt plate 14 is slidably engageable with the upper edge 21 of the wall 6 when the welt plate carriers approach the closed position, as may be seen in FIGS. 2 and 3. When the welt plate carriers are in the fully closed position, a portion of the surface 20 of the welt plate 14 overlies the periphery of the recess 4 which defines the upper surface of a simulated welt integral with the shoe sole. Each welt plate carrier 10 is provided with openings 22 in which are fixed cylindrical members 24, as by screws 26. The surface portions of the cylindrical members 24 which are not disposed within the openings 22 are complementarily engageable with the openings 8 located in the bottom mold member 2. The cylindrical members 24 are of a size substantially the same as the combined size of a welt plate carrier opening 22 and a bottom mold member opening 8. Thus, when the welt plate carriers are in the fully closed position, the cylindrical members 24 are disposed partially in the openings 22 and partially in the openings 8. As the welt plate carriers approach the closed position, the cylindrical members 24 serve to properly align the welt plate carriers, and thereby the welt plates, with the bottom mold member.

The bottom mold member 22 is provided with a sprue passage 28 through which the molten elastomeric material is forced to enter the mold cavity by an injection means not shown. The mold assembly may be provided with an air tell-tale orifice 30 connected to an air tell-tale system which is not shown, but which is well known in the art and acts in conjunction with a cut-off valve (not shown) to automatically shut down the operation of the molten material injection means. Alternative shut-down systems may be used in place of the air tell-tale system.

The welt plate carriers 10 may have fixed thereto toe abutment plates 32 and heel abutment plates 34 (FIG. 1). The abutment plates 32 and 34 have opposed planar surfaces 31, 33 which opposed surfaces are engageable with each other respectively. In addition the toe abutment plates 32 are provided with edge surfaces 35 and the heel abutment plates 34 are provided with edge surfaces 37 which are engageable with the bottom mold member 4. When the welt plate carriers are in the closed position the toe abutment plates 32 engage each other and, in addition, slidably engage a planar surface 36 located on the outside of the wall 6 in the area of the toe portion of the bottom mold member. In like manner, the heel abutment plates 34 engage not only each other, but also a planar surface 38 located on the outside of the wall 6 in the area of the heel portion of the bottom mold member. The engagement of the surfaces 36, 38 respectively, serves to accurately align the welt plate carriers with the bottom mold member upon closing of the mold assembly.

The welt plate carriers are provided with bores 40 having enlarged portions 42. Fitted into each of the bores 40 of one of the welt plate carriers 10 is one end of a locating pin 43 and other end of the pin being receivable by the opposed bore 40 of the other welt plate carrier. When the welt plate carriers approach each other the free ends of the pins 43 enter the opposed bores 40 further to insure proper alignment of the welt plate carriers relative to each other.

A top mold member 44 (FIG. 2) is engageable with the welt plates 14 to completely enclose a mold cavity defined by the bottom mold member, welt plates and top mold member. The top mold member in the illustrative example comprises an upper $u$ mounted upon a last or footform 46.

The illustrative mold assembly is suitable for use in existing injection molding machines, as for example, those described in U.S. patent application Ser. No. 388,070, filed Aug. 7, 1964 in the names of Leslie C. Battell et al., now U.S. Pat. No. 3,339,236, and Ser. No. 452,213, filed Apr. 30, 1965 in the names of Charles J. Kitchener et al., now U.S. Pat. No. 3,358,333. Such machines include means for mounting a bottom mold member, means for moving side mold members into and out of engagement with each other and with the bottom mold member, and means for moving a lasted upper into engagement with the side mold members to enclose a mold cavity. In order to utilize the present invention in such machines, the bottom mold member 2 is substituted for the regular bottom mold member and the welt plate carriers 10 are substituted for the usual side mold members.

In operation, the mold members are initially in the "open" position, that is the welt plate carriers and footform are located outwardly from the stationary bottom mold member. An upper is placed upon the footform and the well plate carriers are caused by side mold moving means, fully described in the above referred-to- patent applications, to move toward each other and toward the bottom mold member.

As the welt plate carriers 10 move toward each other the free ends of the locating pins 43 engage the opposed bores 40. The free ends of the pins 43 are provided with tapered heads 48 which permit the pins 43 to "find" the opposed bore 40 in the event the pins and bores are slightly misaligned. Proceeding further, the pins 43 enter the bores 40 and insure proper alignment of the welt plate carriers relative to one another. Shortly thereafter, the cylindrical members 24 engage the openings 8 in the bottom mold member and thereby serve to align the welt plate carriers, and thereby the welt plates, with the bottom mold member. In addition, the abutment plates 32, 34 engage the planar surfaces 36, 38 respectively, further to insure proper alignment of the side mold members with the bottom mold member. In the "closed" position the abutment plates 32 are in engagement with each other, as are the abutment plates 34.

The footform 46, with an upper $u$ fitted thereon, is then moved into position to engage the welt plates 14 and thereby enclose the mold cavity. Injection means, not shown, but fully described in the above-mentioned patent applications, then causes the sole material, in molten form, to enter the mold cavity through the sprue passage 28. When the mold cavity is filled, the air tell-tale orifice 30 is covered and the automatic shut-down system operates to terminate the injection of fluid. After sufficient cooling time has passed, the welt plate carriers are moved outwardly from the bottom mold member and the footform is moved in a direction away from the bottom mold member. As the footform is moved, it carries with it the upper $u$ with the newly molded-on sole and heel unit attached thereto. The soled upper is then taken from the footform and another upper placed thereon in preparation for another operating cycle.

Referring particularly to FIGS. 4–6, a method of making the mold assembly will now be described.

The present mold assembly is manufactured in such a way as to insure proper alignment of the bores 40 and of the cylindrical members 24 with the openings 8. The assembly, less the footform, is manufactured from a single unitary cast block 50. The block 50 is cast with one surface 52 of the block having a contour corresponding to the contour of a shoe bottom, the remaining surfaces including the bottom surface 56 being planar. Provided in the contoured surface 52 is the recess 4 which is cast to the shape of a sole and heel unit.

The bores 40 are machined laterally of the block. Bores 54 (FIGS. 4 and 5) are machined to a desired depth from the plane 56 of the block 50. The block 50 is then cut into the separate units, the bottom mold member 2 and the two welt plate carriers 10. The bores 40 are provided with the enlarged portions 42. The bores 54 are thus divided, providing the openings 8 on the bottom mold member 2 and the openings 22 on the welt plate carriers 10. The cylindrical members 24 are then fixed to the openings 22. The welt plates 14 are attached to the welt plate carriers. Portions of the welt plate carriers may be removed and the abutment plates 32, 34 secured in their place to enhance wear characteristics, although it is not necessary to the invention. The locating pins 43 are disposed in the bore 40 of one of the welt plate carriers. The bottom mold member and welt plate carriers, having been cut from the same block, are easily brought into alignment with each other without the necessity of complex machining.

If desired, the cylindrical members 24 may be fixed in the bottom mold member openings 8, rather than the openings 22, or may be fixed in a combination of the openings 8, 22, it being necessary merely that a cylindrical member be opposed to an opening for engagement therewith upon closing of the mold assembly.

Having thus described our invention, what we claim as new and desire to secure by Letters Patent of the United States is:

1. A method of making a mold assembly for the molding of soles onto shoe uppers comprising casting a unitary block having an upper surface and an under surface, at least a portion of said upper surface being of a contour corresponding to the contour of a shoe bottom and provided with a recess having a configuration of the shape of a sole unit, boring holes in the under surface of the block to a point in the blocks short of the recess and the upper surface of the block, said holes being so disposed that if extended through the block each would be partially located in said recess and partially located in said upper surface, cutting a central portion from said block on a line extending through said holes, said central portion comprising a bottom mold member including said recess and having a wall extending around the recess, dividing the remainder of the block into two side portions, each of said side portions and said bottom mold member having openings exposed in a side thereof formed by cutting on the line extending through said holes, and attaching cylindrical members in less than all of the openings.

References Cited

UNITED STATES PATENTS

| | | | |
|---|---|---|---|
| 2,120,881 | 6/1938 | Assbroicher et al. | 29—416 |
| 2,382,245 | 8/1945 | McCormack | 29—416 |
| 3,121,947 | 2/1964 | Knox | 76—107 |
| 3,327,570 | 6/1967 | McClartan | 76—107 |
| 3,339,236 | 9/1967 | Battell et al. | 18—17 |
| 2,931,110 | 4/1960 | Pietrocola | 264—328 |

THOMAS H. EAGER, Primary Examiner

U.S. Cl. X.R.

29—463, 527.6, 558